United States Patent

[11] 3,552,727

| [72] | Inventor | Raymond C. Ortgies<br>Louisville, Ky. |
|---|---|---|
| [21] | Appl. No. | 760,446 |
| [22] | Filed | Sept. 18, 1968 |
| [45] | Patented | Jan. 5, 1971 |
| [73] | Assignee | American Air Filter Company Inc.<br>Louisville, Ky.<br>a corporation of Delaware |

[54] GAS SCRUBBING APPARATUS
6 Claims, 4 Drawing Figs.

[52] U.S. Cl. .................................................. 261/109;
    55/241, 55/257; 261/111, 261/112, 261/116,
    261/118
[51] Int. Cl. .................................................. B01d 47/00,
    B01d 47/10
[50] Field of Search .......................................... 55/240,
    241, 223, 257; 261/108—112, 126, V.S.,
    116—118

[56] References Cited
UNITED STATES PATENTS

| 1,062,445 | 5/1913 | Ernst ........................... | 55/223 |
| 1,062,446 | 5/1913 | Ernst ........................... | 55/223 |
| 3,347,024 | 10/1967 | Dock et al. .................. | 55/241 |
| 3,432,153 | 3/1969 | Drum ........................... | 55/257 |

*Primary Examiner*—Frank W. Lutter
*Assistant Examiner*—Steven H. Markowitz
*Attorneys*—Ralph B. Brick and Edward M. Steutermann ABSTRACT: An improved gas scrubbing apparatus including a housing surrounding an open end stack to provide a passageway therebetween, the passageway having a plurality of pairs of oppositely inclined baffle members spaced to provide a plurality of gas apertures in such passageway, scrubbing liquid being introduced along the inclined surfaces of the baffle members to flow into the gas apertures and scrub gases passing therethrough as they are deflected from the open end stack into the passageway.

PATENTED JAN 5 1971
3,552,727
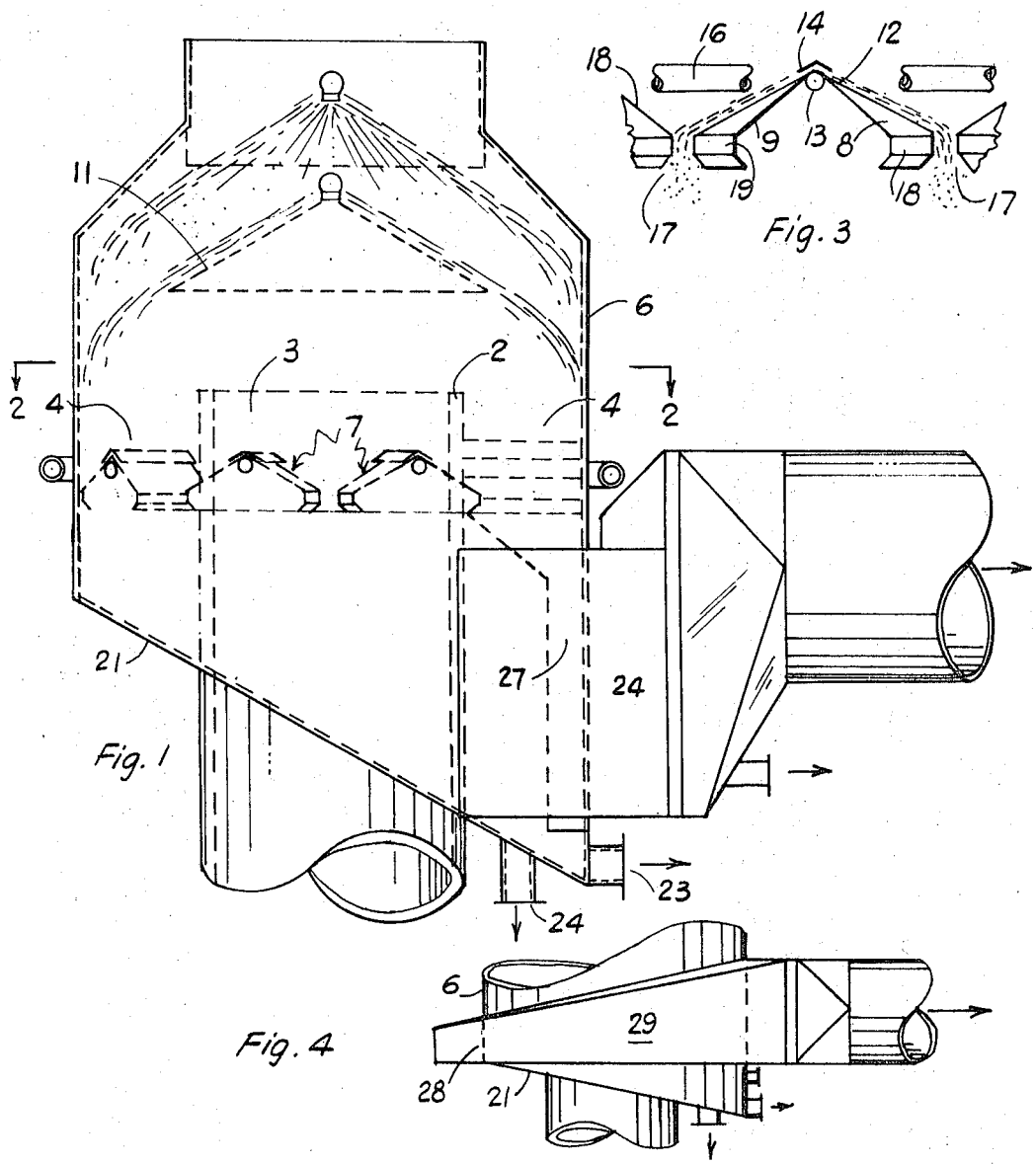
Fig. 1
Fig. 3
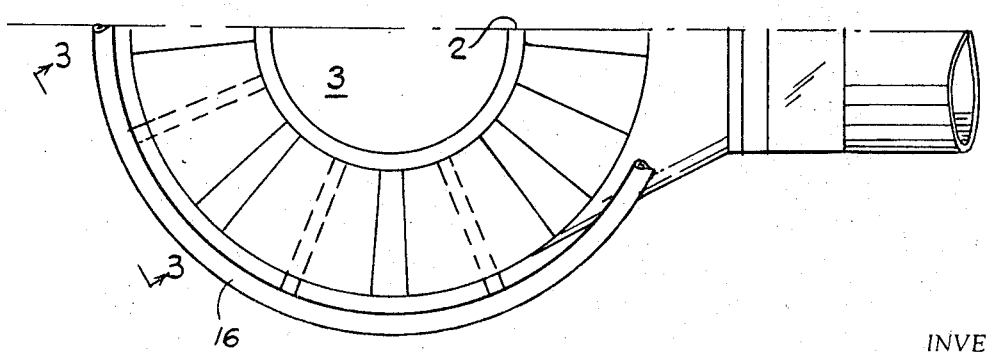
Fig. 4
Fig. 2
INVENTOR.
Raymond C. Ortgies
BY Roger Q. Buck

3,552,727

GAS SCRUBBING APPARATUS

BACKGROUND OF THE INVENTION

The present invention relates to gas scrubbing apparatus and finds particular utility in gas and liquid contact apparatus where multiple liquid fluid distribution is utilized.

In various industrial facilities in the metallurgical and other arts, numerous arrangements have been utilized at the open end of dirty gas discharging stacks to rid dirty gases from dust and fly ash and to suppress sparks in the gases. Many of these arrangements have required extensive auxiliary equipment and duct work, have been expensive in construction and maintenance, have occupied considerable space, and have been relatively ineffective in proper gas distribution and in securing efficient removal of entrained particles from the stack gases.

SUMMARY OF THE INVENTION

The present invention provides an improved gas scrubbing apparatus which is straightforward in construction, operation, and maintenance, providing efficient contaminant removal at a minimum of cost. In addition, the present invention provides a gas scrubbing apparatus which permits a thorough distribution of the dirty gas stream to be treated, and at the same time, a thorough distribution of the scrubbing liquid. In addition, the apparatus of the present invention provides for efficient removal of clean gas and dirty liquid. Further, the apparatus of the present invention provides a stable, overall construction, accommodating for any expansion-contraction distortions which might occur as the result of temperature changes.

Various other features of the present invention will become obvious to one skilled in the art upon reading the disclosure set forth hereinafter.

More particularly, the present invention provides apparatus for scrubbing contaminants from a dirty gas stream emanating from a contaminated gas source comprising: open end stack means communicating with the gas source to conduct dirty gases therefrom; a housing surrounding the stack means to provide a passage therebetween; deflector means disposed within the housing in spaced, aligned relation from the open end of the stack means to divert dirty gas emanating therefrom to flow in a direction along the passage between the stack means and the housing; a plurality of pairs of baffle members extending transverse the gas passage between the housing and the stack, the baffles of each pair extending in opposed inclined relation to the direction of gas flow through the passage, with the downstream edges of the baffle members of adjacent pairs being spaced from each other to provide a gas aperture therebetween; means to introduce scrubbing liquid along the inclined surfaces of the pairs of baffle members to flow into the gas apertures between the downstream edges of the baffle member pairs to scrub the gases passing therethrough; means to remove the scrubbed gases downstream the gas apertures; and means to remove the excess liquid downstream the gas apertures.

It is to be understood that various changes can be made in the arrangement, form, and construction of the apparatus disclosed herein without departing from the scope of or spirit of the present invention.

Referring to the drawing which s discloses one advantageous embodiment of the present invention and a modification thereto:

FIG. 1 is a sectional elevational view of an open end stack with the novel gas scrubbing apparatus arrangement therearound;

FIG. 2 is a sectional plan view of a segment of the apparatus of FIG. 1 taken in a plane passing through line 2—2 of FIG. 1;

FIG. 3 is an enlarged schematic view of the inclined baffle member pairs of the apparatus of FIG. 1; and FIG. 4 discloses a modified arrangement for gas removal in accordance with the present invention.

Referring to FIG. 1, open end stack 2 is disclosed with the novel gas scrubbing apparatus therearound. It is to be understood that stack 2 can be utilized with any one of several industrial or commercial facilities which discharge hot gas streams laden with entrained solids, mists and vapors. For example, the stack can be connected to metallurgical apparatus such as iron cupola furnaces or oxygen steel converters, or it can be connected to steam-electric power plants or black liquor furnaces in the paper industry. It further is to be understood that the stack is suitably lined in accordance with the physical and chemical characteristics of the dirty gases emanating therefrom. As disclosed, the stack is cylindrical in cross-sectional configuration and is vertically oriented with an upper outlet terminus 3. However, in other embodiments, it would be possible to have the stack of different geometrical configuration and orientation. Surrounding stack 2 in spaced relation therefrom to provide passageway 4 is housing 6. Like stack 2, housing 6 can be cylindrical in cross-sectional configuration so that passageway 4 therebetween is of annular nature. Disposed within passageway 4 to extend transverse thereof are pairs of baffle members 7. Each pair of baffle members includes baffles 8 and 9 which extend in opposed inclined relation to the direction of gas flow through passage 4. In this connection, attention is directed to the circular generally horizontal deflector 11 which is centrally disposed in housing 2 above the terminus 3 of stack 2. Although deflector 11 is shown as conical in shape, it is to be understood that other configurations can be utilized, the deflector serving to turn the gases emanating from terminal 3 toward passage 4 between the housing and the stack.

As can be seen more readily in FIG. 3 of the drawing, the upstream edges of baffles 8, 9 of each pair of baffle members 7 are substantially adjacent to form an apex 12. A suitable liquid branch conduit 13 is provided at apex 12, the conduit being provided with a plurality of holes which are positioned to direct liquid toward the splash plate 14, which, in turn, deflects such liquid along the upper surfaces of inclined baffle members 8, 9. As can be seen in FIG. 3, liquid is introduced into the branch conduits 13 by means of a liquid header 16 connected to a suitable liquid source, the header being in the form of a bustle surrounding housing 6. As can further be seen in FIGS. 2 and 3, the downstream edges of baffle members 8, 9 are spaced apart to provide gas apertures 17. Spaced opposed plate members 18 and 19 connected to the downstream edges of baffle members 8, 9, respectively, are provided to define passages for the gas stream to be treated. It is to be noted that the downstream portions of plate members 18 and 19 can be bent outwardly to provide a suitable evase effect. It is to be understood that the pairs of spaced baffle members 7 can be arranged in a continuous fashion around the annular passageway 4.

As will be noted in FIG. 1 of the drawing, housing 6 has connected at the lower extremity of the sidewall thereof a base wall member 21, the base wall being in an inclined position and surrounding stack 2 to permit a suitable drain of the treating liquid to outlets 23 and 24. In the embodiment of the apparatus of FIG. 1, a gas takeoff 24 can be provided above the lower extremity of the inclined base wall member. In such event liquid shield means 27 having a U-shaped cross-sectional configuration is provided to depend from those passages 17 adjacent outlet 24 to prevent liquid from being entrained in the scrubbed gas stream upon removal. As will be noted in FIG. 4, a gas outlet means 28 can be positioned above the upper extremity of base wall 21, and a suitable bustle 29 can be arranged around the outer portion of the housing 6 to reduce space requirements.

I claim:

1. Apparatus for scrubbing contaminants from a dirty gas stream emanating from a contaminated gas source comprising: open end stack means communicating with said gas source to conduct dirty gases therefrom; an enclosing housing surrounding said stack means to provide a passage between the side of said stack and said housing; deflector means disposed within said housing in spaced aligned relation from the open end of said stack means to divert dirty gases emanating therefrom to flow in a direction along said passage between said stack means and said housing; a plurality of pairs of baffles extending transverse said gas passage between said housing and said stack in side-by-side relation, the baffles of each pair extending in opposed diverging relation with respect to each other in the direction of gas flow through said passage, the downstream edges of said baffles of adjacent pairs being spaced from each other to provide a gas aperture therebetween; means to introduce scrubbing liquid along the inclined surfaces of said pairs of baffles to flow into said gas apertures between the downstream edges of said baffle pairs to scrub the gases passing therethrough; means to remove the scrubbed gases downstream said gas apertures; and means to remove the excess liquid downstream said gas apertures.

2. The apparatus of claim 1, the upstream edge of the baffles of each pair being adjacent each other to form an apex, and a liquid conduit extending therebetween to introduce scrubbing liquid along the diverging surfaces of said baffles.

3. The apparatus of claim 1 and spaced opposed parallel plates connected to the downstream edges of said baffles to define aperture flow passages for the gas stream to be treated and liquid shield means depending from certain preselected aperture passages to prevent liquid from being entrained in the scrubbed gas stream upon removal.

4. The apparatus of claim 1, said stack means being cylindrical in configuration and of vertical disposition, said housing surrounding said stack also being cylindrical and vertical to provide an annular passage therebetween.

5. The apparatus of claim 4, said means to remove the scrubbed liquid downstream said gas apertures comprising an inclined base wall member connected at the lower extremity of said cylindrical housing side wall and surrounding said stack, and liquid outlet means adjacent the lower extremity of said base wall.

6. The apparatus of claim 5, said means to remove the scrubbed gas including a gas outlet means adjacent the upper extremity of said base wall.